June 22, 1965   J. ADAMS, JR   3,190,137
RUBBER FACED BELT WITH FIBER TRACTION SURFACE
Filed Oct. 28, 1958

INVENTOR.
JAMES ADAMS JR.
BY
James V. Franklin
ATTORNEYS

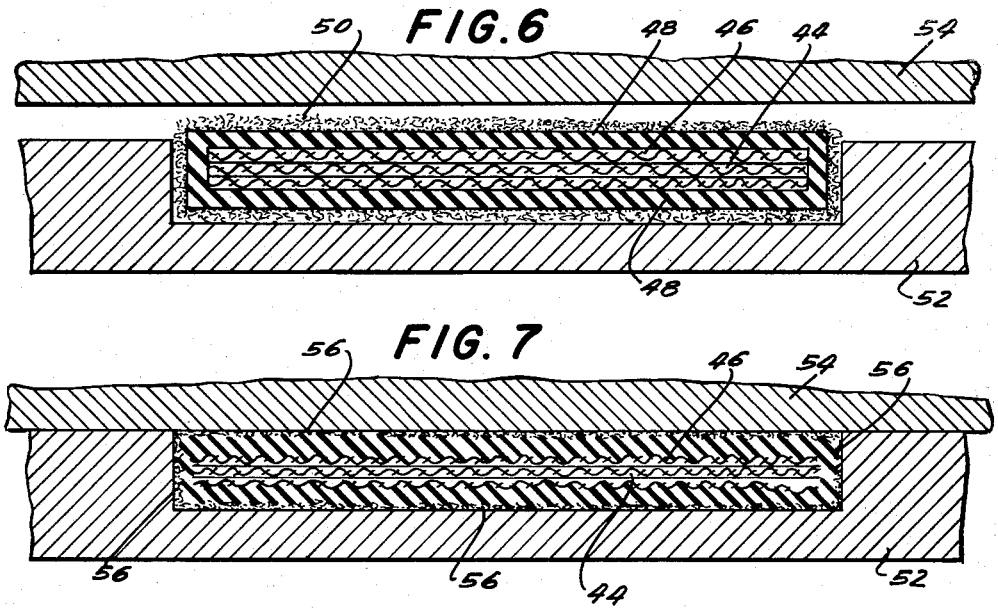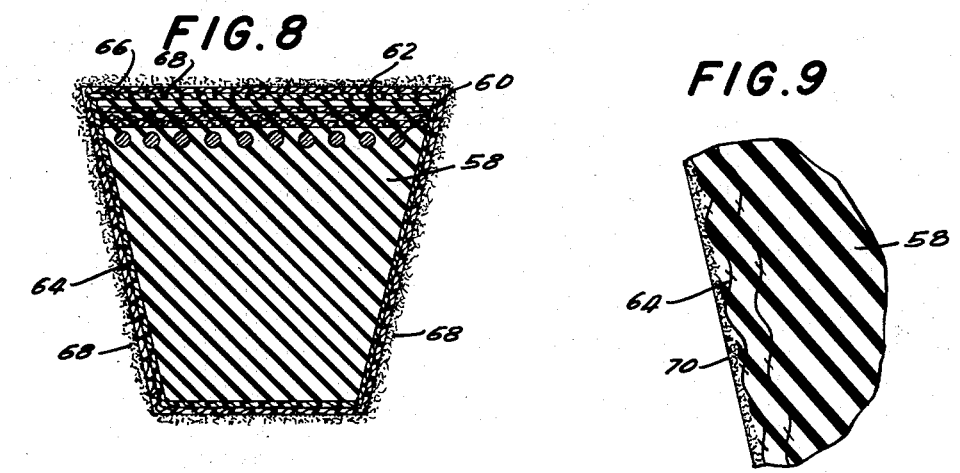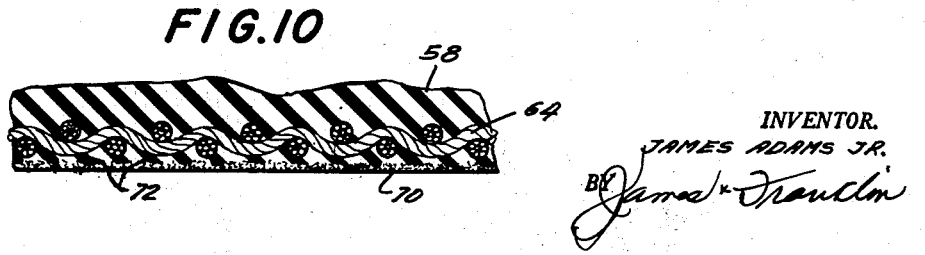

United States Patent Office 3,190,137
Patented June 22, 1965

3,190,137
RUBBER FACED BELT WITH FIBER TRACTION SURFACE
James Adams, Jr., Packanack Lake, N.J., assignor to Raybestos-Manhattan, Inc., Passaic, N.J., a corporation of New Jersey
Filed Oct. 28, 1958, Ser. No. 770,202
7 Claims. (Cl. 74—233)

This invention relates to belts and more particularly to power transmission belts although the principles of the invention are also applicable to conveyor belts.

The prime object of invention centers about the provision of improved traction surfaces for power driven rubber faced belts such as belts with multi rib and groove traction faces, V-belts, and flat faced belts.

It is common in the art to employ woven fabric impregnated with rubber as a protective cover and as a driving or traction surface for power transmission belts. The rubber is lodged on and between the warp and weft threads or cords of the woven fabric, serving as a bonding medium for the protective cover and as a resilient cushion between the fabric threads.

In the patent to James Adams, Jr., No. 2,620,016 of December 2, 1952, I disclose a method of applying a fabric covering to the rubber faces of a multi rib and groove transmission belt. Preparation and application of the fabric covering to make a zig-zag shape of the ribs and grooves is a costly operation. Unopened folds and creases of the fabric prevent the complete formation of the rib profile and are a source of defective products. Relatively hard, inflexible spots also occur at the fabric splices. The prime object of the present invention, in one of its applications, is directed to the provision of a fiber covering for the rubber rib and groove traction faces of such belts in substitution for the rubber-impregnated-fabric covers. Thereby a protective cover for the traction faces is obtained without splices, or preliminary pleating or folding of the fabric, which protective cover forms a durable, non-cracking, fiber-traction surface layer on the traction ribs of the belt.

Ordinary V-belts provided with woven fabric rubber impregnated covers as their traction surfaces are subject to cover breakdown in use. In the course of frictional driving, the rubber which is lodged on and between the warp and weft threads or cords of the fabric, possessing a relatively high coefficient of friction or grab to the pulley surface, pulls out or erodes out from between the warp and weft threads. This leaves unprotected the fabric threads which are thereby rendered bare; and this is one of the principal reasons for belt-surfaces breakdown and wearout. A further prime object of the present invention resides in the application by addition to such protective fabric covers of a fiber traction layer, the resulting traction surface being characterized by longer wearing and greater durability in friction driving and in flexing.

I have found that by depositing and adhering fiber-flock onto the unvulcanized rubber surface or rubber surface portions of a belt, and then vulcanizing the same and applying sufficient pressure during vulcanizing whereby the rubber flows around, immerses and bonds the fibers of said fiber-flock, a belt is produced coated with a bonded fiber traction surface, which traction surface possesses improved flexing and wearing traction results. I have found that this can be accomplished with surprising success on rubber faced traction belts such as V-belts, multi rib and grove belts and flat belts, and on impregnated rubber fabric covers on V-belts and the like.

Special service surface characteristics such as: oil resistance, static electric conductivity, resistance to acids and alkalies, resistance to unusual abrasion, flexibility at low temperatures, require in each case in the present art, special rubber compounds and fabric fiber types built into the structure of the belt. Such special purpose belts are often not available or are of very high cost because it is now costly and time consuming to obtain and process special fabrics and rubber compounds for short runs or small quantities of belts. It is a further object of this invention to impart to a common basic belt structure, prior to vulcanization, any one or more of the above special characteristics by deposit, in the manner described, a surface made of any selected rubber compound cement and fiber-flock combination.

To the accomplishment of the foregoing objects and such other objects as may hereinafter appear my invention relates to the method and the product of the method as more particularly defined in the appended claims, taken together with the following description and the accompanying drawings in which FIGS. 1 to 5 collectively depict the method of making a multi rib and groove traction belt employing the principles of the present invention and in which:

FIGS. 6 and 7 collectively show the manner of making a flat belt in accordance with the principles of the present invention and in which:

FIG. 6 is a cross sectional view showing a flat rubber and fabric belt with the fiber-flock deposited and adhering onto the unvulcanized rubber surface of the belt, the product being ready for a molding operation; and FIG. 7 is a view similar to FIG. 6 showing the molding and vulcanizing of the belt.

FIGS. 8 to 10 collectively show the principles of the invention applied to the making of a fabric covered V-belt with a fiber traction surface and in which:

FIG. 8 is a cross sectional view of a fabric covered V-belt before vulcanizing and molding on the cover on which the fiber-flock is deposited;

FIG. 9 is a cross sectional view taken on an enlarged scale showing a portion of the belt of FIG. 8 after molding and vulcanizing; and FIG. 10 is a cross sectional view taken on still a further enlarged scale depicting the resultant traction surface of the V-belt.

Figure 1:
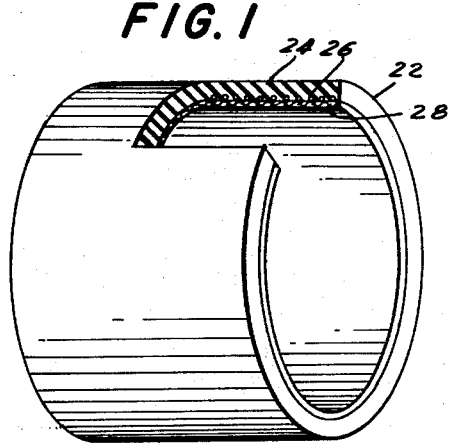
FIG. 1 is a perspective view with a part broken away and shown in section of a rubber and fabric belt sleeve assembly before vulcanization and molding.
Figure 2:
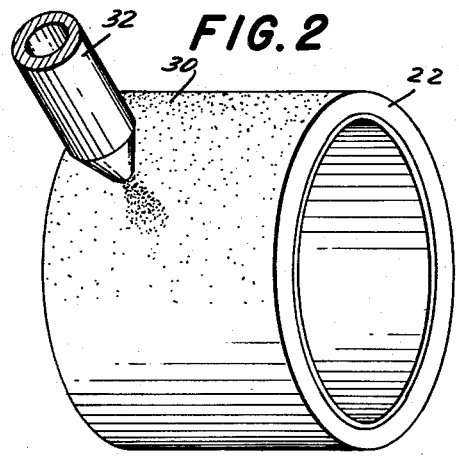
FIGS. 2 and 3 are perspective views depicting steps in the method of depositing and adhering fiber-flock onto the unvulcanized rubber surface of the belt sleeve assembly.
Figure 3:
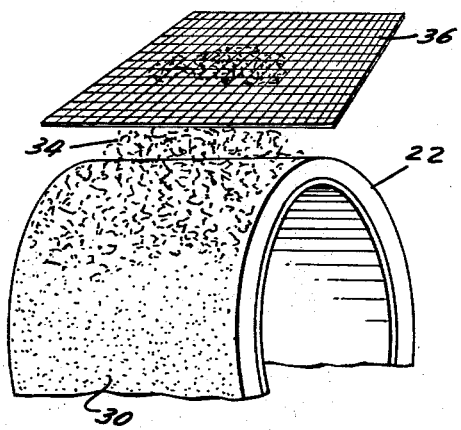
Figure 4:
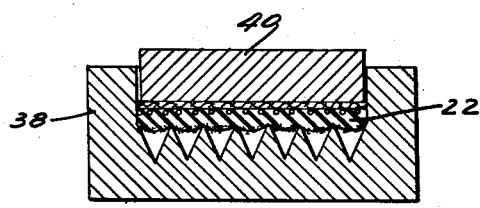
FIG. 4 is a view taken in cross section depicting a step in the molding and vulcanizing of the belt sleeve assembly obtained in the preceding steps of the method.
Figure 5:
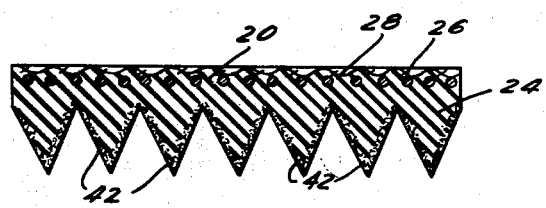
FIG. 5 is a view taken in cross section and shown to an enlarged scale of the multi rib and groove belt after molding and vulcanizing.

Referring now more in detail to the drawings and having reference first to FIGS. 1 to 5 thereof, the multi rib and groove belt 20 depicted in FIG. 5 is made by the method steps depicted in FIGS. 1 to 4. The belt product may be first built up in the form of a rubber-fabric sleeve shaped carcass 22 which in the final product will comprise a rubber compression section 24, a neutral axis inextensible cord section 26 and a tension section 28 comprising one or more superimposed strips of rubberized fabric. In the next step of the process, cement 30 is applied to the outer surface of the belt carcass 22 by any suitable means such as a spraying device 32. On to this wet cement coating there is then sprinkled, as depicted in FIG. 3 of the drawings, an even random "brushheap" layer of fiber-flock 34 which may be deposited from a shaker screen 36. The sleeve carcass 22 may be rotated during these steps of the process, the required amount of fiber-flock being deposited over the entire outer surface of the belt sleeve. Desirably, the belt sleeve is then agitated to shake off any excess fiber-flock. The product thus obtained is then molded and vulcanized in a heated mold, generally depicted in FIG. 4 of the drawings, comprising a ribbed mold 38 and a pressure plate 40. The belt obtained after this molding and vulcanizing step is that depicted in FIG. 5 of the drawings.

I find that the density of the fibrous surface obtained in the steps of the method depicted in FIGS. 2 and 3 of the drawings should be in the order of the density of common fabrics as used for belt traction surfaces, namely in the order of ¼ to ⅝ ounces of fiber per square yard per thousandths of an inch thick of fiber. To have less exposes too much rubber gum to the surface resulting in either gumming up or balling up of sticky rubber or excessive powdering off and loss of gum by attrition; and to have more is to result in early flex-cracking and loss of fiber due to insufficient rubber bonding around the fibers. The fibers should be fine, dense and short fibers having a fineness preferably not coarser than in the order of 15 denier and preferably having a length not longer than ⅛". The thickness of the applied fiber-flock will vary with the thickness of the rubber belt and severity of service; and as an example, multi rib and groove belts having a thickness of from 3/16" to ⅜", measured from the outer surface of the belt to its neutral axis should have deposited thereon from ½ to 3 ounces of the fiber-flock per square yard of belt.

In the resulting product, as shown in FIG. 5 of the drawings, the deposit of the fiber-flock on the rubber face of the belt forms a fiber covering layer 42 on the belt, the fibers of which are immersed in, localized to and bonded by the vulcanized surface layer of the rubber belt face. This covering layer yields improved flexing and wearing traction surface results. As applied to a multi rib and groove belt there is also obtained in the molding step of the process a desirable re-orientation of the fibers produced by a lateral stretching of the fiber layer when the flat traction surface of the belt is changed into a multi V-shape. This will be further understood from the following analysis. The random lay of the fibers that occurs in the step of FIG. 3 of the drawings distributes the fibers in all directions uniformly. Thereby half of the fibers have a direction less than 45° to the length of the belt and the remaining fibers have a direction of more than 45°. When the surface of the belt is stretched laterally, as during the molding step in the ribbed mold, only ⅙ of the fibers in the resulting product make an angle of less than 45° with the lengthwise or unstretched direction of the belt, whereas the remainder, namely the bulk of the fibers, or ⅚ thereof, assume a direction of 45° or more away from the lengthwise or unstretched direction of the belt. It results therefore that the belt surface is relatively flexible in the lengthwise direction and relatively stiff in the crosswise direction, and thereby a greater flexibility or resistance to cracking is obtained. While in the steps of the method described I have preferred to first coat the belt carcass with the cement and then deposit the fiber-flock on the wet cement, I find that the same effects may be obtained by coating the unvulcanized rubber surface of the belt with a cement dispersion of fiber-flock.

In FIGS. 6 and 7 of the drawings the invention is shown applied to flat rubber faced belts. Such belts may comprise a carcass consisting of a plurality of superimposed layers of rubberized fabric 44 encased in an outer covering of rubber 46. To all of the outer surfaces of this belt there is applied a cement coating 48 over which there is then deposited a brushheap layer of fiber-flock 50. This assembly is then subjected to a molding and vulcanizing step in a mold comprising a lower mold member 52 and an upper pressure plate 54. In the resulting product, the deposit of the fiber-flock on the rubber face of the belt forms a fiber covering layer 56 (FIG. 7), the fibers of which are immersed in, localized to and bonded by the vulcanized surface layer of the rubber face of the belt, yielding a traction surface possessing an improved flexing and wearing traction face. In applying the invention to flat belts the fineness, density, and length of the fibers are preferably of the same order as that described in connection with the belt process of FIGS. 1 to 5. Flat cord rubber belts made with a similar fiber-flock surface have shown that the traction surfaces last several times as long as a conventional woven fabric surface whether or not a conventional fabric ply is beneath the fiber-flock surface.

In FIGS. 8 to 10 the principles of the invention are shown applied to belts such as V-belts which are normally made with a fabric covering and to which a layer of fiber-flock is applied after the manner depicted in FIGS. 1 to 7 of the drawings. In FIG. 8 the V-belt assembly prior to molding and vulcanizing is shown to comprise a built-up carcass having a rubber body 58 which in the final product will be the compression section of the belt, inextensible cords 60 which in the final product will comprise the neutral axis section of the belt, and a plurality of superimposed strips of rubberized fabric 62, which in the final product will comprise the outer tension section of the belt. This carcass is covered with one or more layers of a rubber-impregnated-fabric 64 which normally in the final product comprises the traction face of the belt. It is to the outer face of the cover 64 that I apply an even random brushheap layer of fiber-flock preferably on wet cement, the cement 66 being first applied to the cover 64 upon which the fiber-flock 68 is deposited. This assembly is then subjected to the usual molding and vulcanizing step.

In the fiber depositing step of the process as applied to these fabric covered V-belts I preferably employ the fine, dense and short fiber of the character previously described in connection with the process depicted in FIGS. 1 to 5 of the drawings. In the resulting product the fiber-flock on the rubber portions of the rubber impregnated cover 64 forms a fiber layer covering such as 70, as more particularly shown in FIGS. 9 and 10 of the drawings, the fibers of which are immersed in, localized to and bonded by the vulcanized surface rubber portions of the rubber impregnated fabric cover 64. In fabric covered V-belts, the surface rubber, such as rubber in the regions marked 72 in FIG. 10, in the course of fictional driving, due to its relatively high coefficient of friction or grab to the pulley surface, pulls out or erodes out from between the warps and wefts of the fabric, leaving the fabric threads bare and unprotected. This is one of the principal ways in which the belt surface of such belts break down and wear out. I find that with the applied fibrous flock layer 70, a traction surface of longer wearing and greater durability in friction driving and flexing occurs, the reason being that the layers of the small fibers form protective bridges across the openings or interstices between the warp and weft cords of the woven fabric. This reduces the size of the islands of rubber gum exposed out of the fabric openings as found in a finer-weave fabric but still retaining the flexibility of a coarser-weave fabric. In short, the fiber-flock covering laid onto a conventional woven fabric rubber-impregnated traction surface bridges the relatively coarse openings of the fabric thereby retarding the loss by wear and friction of rubber from the interstices between the weft and woof cords of the fabric, the result being a substantial increase in the flex-cracking and wear resistance of the traction surface.

The manner of making the various described types of power transmission belts with a fiber-flock covering as the traction surface, and the characteristics of the resulting belts, will be apparent from the above detailed description thereof. For each type of belt, the fibers of the flock form in the resulting product a fiber layer covering for the rubber face or rubber faced portions of the traction side of the belt, the individual fibers of which are immersed in, localized to and bonded by the vulcanized surface rubber of the belt. For each type, an improved flex-crack and wear traction surface results. For the multi rib and groove belts a greater flexibility in the desired belt direction, namely lengthwise of the belt, is also achieved due to the lateral stretching of the fiber layer due to the converting in the mold of the traction face from a flat to a ribbed form.

It will be apparent that many changes may be made in the steps of the process as well as in the application of the process to different belt structures without departing from the spirit of the invention as defined in the following claims.

I claim:

1. A rubber faced belt provided with a fiber immersed traction surface layer comprising, a belt carcass having a vulcanized rubber body provided with a vulcanized rubber traction surface layer, and a deposit of fiber-flock in said rubber traction surface layer, the fibers of the fiber-flock being immersed in, localized to and bonded to the rubber in the said vulcanized traction surface layer of the belt carcass, thereby forming a fiber-immersed-rubber traction surface on the rubber belt.

2. The rubber faced belt of claim 1 in which the density of the fiber-flock is of the order of ¼ to ⅝ ounces of fiber per square yard per thousandths of an inch thick of fiber.

3. The rubber faced belt of claim 1, in which the fibers comprise a random deposit covering the belt face of fine, dense and short fibers having a fineness not coarser than the order of 15 denier.

4. A rubber faced belt provided with a fiber immersed traction multi rib and groove surface layer comprising, a belt carcass having a vulcanized rubber body providing a vulcanized rubber multi rib and groove traction surface layer, and a deposit of fiber-flock in said rubber traction surface layer, the fibers of the fiber-flock being immersed in, localized to and bonded to the rubber in the said vulcanized traction surface layer of the belt carcass, thereby forming a fiber-immersed-rubber traction surface on the rubber belt.

5. The rubber faced belt of claim 4 in which the bulk of the fibers lie in the direction of at least 45° away from the lengthwise direction of the belt.

6. A fabric covered rubber faced belt provided with a fiber immersed traction surface layer comprising, a belt carcass having a vulcanized rubber body provided with a vulcanized rubber-impregnated-fabric traction surface layer, and a deposit of fiber-flock in said rubber-impregnated-fabric traction surface layer, the fibers of the fiber-flock being immersed in, localized to and bonded to the rubber in the said vulcanized traction surface layer of the belt carcass, thereby forming a flock fiber-immersed-rubber traction surface on said rubber belt.

7. A fabric covered rubber faced V-belt provided with a fiber immersed traction surface layer comprising, a rubber V-belt carcass having a vulcanized rubber body provided with a vulcanized rubber-impregnated-fabric traction surface layer, and a deposit of fiber-flock in said rubber-impregnated-fabric traction surface layer, the fibers of the fiber-flock being immersed in, localized to and bonded to the rubber in the said vulcanized traction surface layer of the belt carcass, thereby forming a flock fiber-immersed-rubber traction surface on said rubber belt.

References Cited by the Examiner
UNITED STATES PATENTS

| 14,389 | 3/56 | Cheever | 154—4 |
| 81,740 | 9/68 | Bishop et al | 154—4 |
| 1,192,794 | 7/16 | Price. | |
| 1,332,390 | 3/20 | Foster | 154—4 |
| 1,611,830 | 12/26 | Freedlander | 154—4 |
| 1,905,363 | 4/33 | Bohlin | 117—33 |
| 1,995,734 | 3/35 | Callahan | 154—48 |
| 2,349,153 | 5/44 | Ferrante | 117—33 |
| 2,461,654 | 2/49 | Nassimbene | 154—4 |
| 2,620,016 | 12/52 | Adams | 154—4 |
| 2,773,540 | 12/56 | Waugh | 154—4 |
| 2,801,947 | 8/57 | Winchester | 154—110 |
| 2,802,511 | 8/57 | Waugh | 154—4 |
| 2,812,008 | 11/57 | Bright | 154—4 XR |

FOREIGN PATENTS

| 1,131,865 | 10/56 | France. |
| 619,329 | 9/35 | Germany. |
| 346,279 | 4/31 | Great Britain. |

EARL M. BERGERT, *Primary Examiner.*

R. LEIBOWITZ, CARL F. KRAFFT, ALEXANDER WYMAN, *Examiners.*